United States Patent [19]

Uehara

[11] Patent Number: 4,941,060
[45] Date of Patent: Jul. 10, 1990

[54] RECORDING AND/OR REPRODUCING APPARATUS UTILIZING RECORD BEARING MEDIA OF THE DISC TYPE

[75] Inventor: Tsukasa Uehara, Tokyo, Japan

[73] Assignee: Canon Kabushiki Kaisha, Tokyo, Japan

[21] Appl. No.: 282,873

[22] Filed: Dec. 5, 1988

Related U.S. Application Data

[63] Continuation of Ser. No. 201,251, May 25, 1988, abandoned, which is a continuation of Ser. No. 67,402, Jun. 24, 1987, abandoned, which is a continuation of Ser. No. 648,701, Sep. 7, 1984, abandoned.

[30] Foreign Application Priority Data

Sep. 9, 1983 [JP] Japan .................................. 58-165228

[51] Int. Cl.$^5$ ............................................. G11B 17/02
[52] U.S. Cl. .................................. 360/99.05; 360/99.12
[58] Field of Search ........................... 360/99.05, 99.12

[56] References Cited

U.S. PATENT DOCUMENTS

| | | | |
|---|---|---|---|
| 4,024,581 | 5/1977 | Lesca et al. .......................... | 360/99 |
| 4,498,161 | 2/1985 | Eisemann .............................. | 360/97 |
| 4,539,613 | 9/1985 | Suyama et al. ....................... | 360/97 |
| 4,647,996 | 3/1987 | Shimaoka et al. .................... | 360/97 |
| 4,686,593 | 8/1987 | Watanabe et al. .................... | 360/97 |
| 4,703,373 | 10/1987 | Dosaka ................................. | 360/97 |

OTHER PUBLICATIONS

Rusch et al., "Flexible ... Mechanism", IBM Tech Disc Bull, vol. 22, No. 1, Jun. 1979, p. 293.

*Primary Examiner*—Robert S. Tupper
*Attorney, Agent, or Firm*—Toren, McGeady & Associates

[57] ABSTRACT

A recording and/or reproducing apparatus using a disc-shaped flexible record bearing medium, including a holder for receiving the medium and movable for placing the received medium at a predetermined position for signal recording and/or reproduction, and a pair of sliding members slidable for moving the holder. One of the sliding members has a first cam for operating a pressing member which presses a portion of the medium to mount the same on a rotating spindle, while the other of the sliding members has a second cam for moving a stabilizing member to an operative position at which the stabilizing member stabilizes a portion of the medium near a recording and/or reproducing head when the medium is rotated by the spindle.

35 Claims, 4 Drawing Sheets

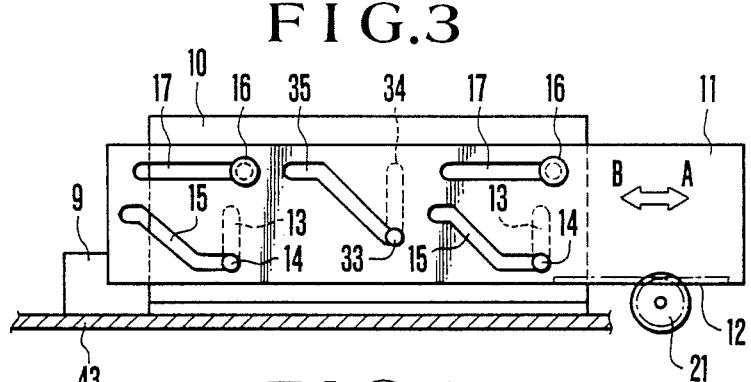
FIG.3
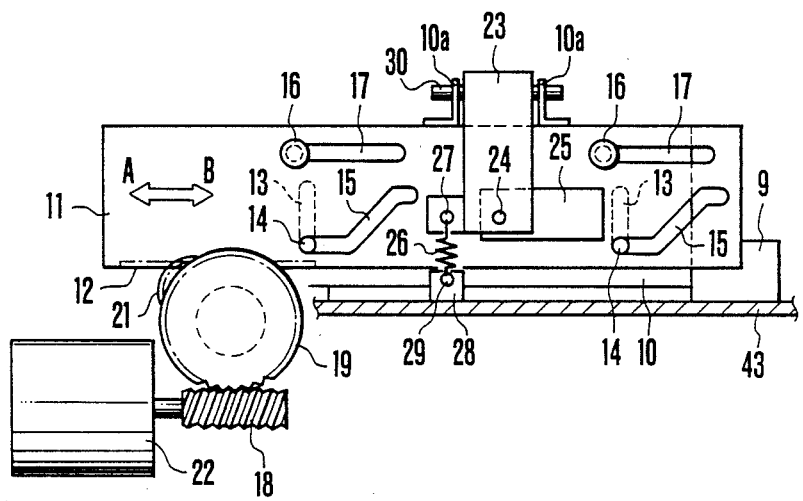
FIG.4
FIG.5
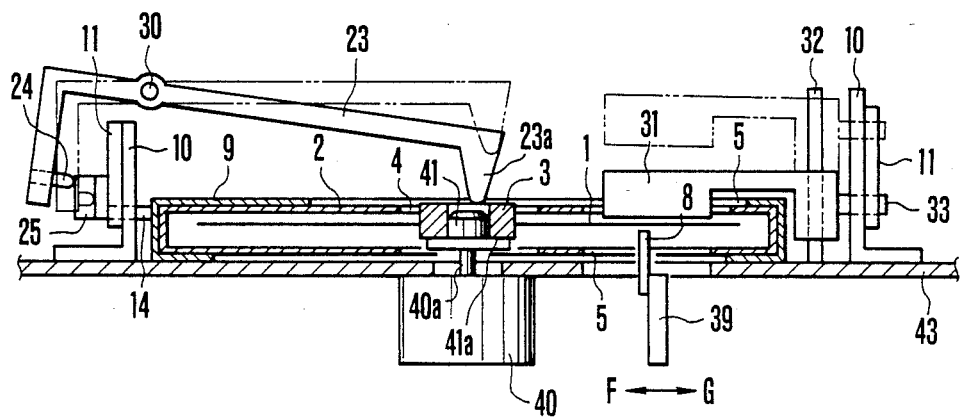

RECORDING AND/OR REPRODUCING APPARATUS UTILIZING RECORD BEARING MEDIA OF THE DISC TYPE

This is a continuation application of Ser. No. 201,251, filed May 25, 1988, now abandoned which in turn is a continuation application of Ser. No. 067,402, now abandoned filed June 24, 1987, which in turn is a continuation of Ser. No. 648,701, now abandoned filed Sept. 7, 1984.

BACKGROUND OF THE INVENTION

1. Field of the Invention

This invention relates to a recording and/or reproducing apparatus of the kind using a disc-shaped flexible record bearing medium and more particularly to a record bearing medium loading mechanism therefor.

2. Description of the Prior Art

For recording and/or reproducing apparatuses of the kind using a disc-shaped flexible record bearing medium such as a flexible magnetic disc and the like, there have been proposed many kinds of mechanisms for loading or mounting such a record bearing medium on the apparatus in a predetermined position for signal recording or reproduction. Many of these loading mechanisms are arranged to have the record bearing medium loaded and unloaded in a so-called front loading method.

In the mechanism of this kind, a cam groove is provided in a slide member which is arranged to be movable or slidable in two directions. A pin erected on a record bearing medium holder is arranged to engage with the cam groove of the slide member through a slot which is separately provided in a chassis frame. The record bearing medium is loaded or unloaded by moving the slide member in a forward or backward direction to cause the record bearing medium holder to move downward or upward relative to a record bearing medium rotating driving part.

Meanwhile, in an apparatus adapted for still picture recording and/or reproducing operations, for example, a high degree of playback accuracy is required. Therefore, in loading the record bearing medium, the record bearing medium must be accurately mounted on the rotating driving part and must be accurately set in a predetermined position relative to the recording and/or reproducing head. To meet this requirement, there has been proposed an arrangement wherein a pushing or pressing member is used for pushing the mounting part of the record bearing medium against the rotating driving part of the apparatus. Further, it has been the practice to use a stabilizing member which is opposed to the recording and/or reproducing head and is arranged to keep a flexible record bearing medium in satisfactory contact with the head by allowing the flexible medium to rotate and travel in a stable manner at least in the vicinity of the head.

However, the pressing member and the stabilizing member necessitate use therefor of a drive source separately from another drive source which is provided for loading the record bearing medium. This, therefore, complicates the structural arrangement of the apparatus. Besides, upon completion of a loading operation, the pressing member and the stabilizing member must be shifted to their respective operating positions after the drive source for loading is switched off. Thus, the length of time required for loading as a whole cannot be shortened.

SUMMARY OF THE INVENTION

It is therefore an object of the present invention to provide a novel recording and/or reproducing apparatus which is capable of solving the above-stated problems.

It is another object of the invention to provide a recording and/or reproducing apparatus wherein a moving mechanism provided for one or more members to be operated in association with a record bearing medium loading operation, such as a pressing member to be used for loading a record bearing medium and/or a record bearing medium stabilizing member, is simplified; a timing for moving these members is arranged to be apposite to shorten the length of time required for loading.

Under these objects, according to a first one of the aspects of the present invention, a recording and/or reproducing apparatus using a disc-shaped record bearing medium, comprises holder means for receiving the medium and movable for placing the received medium at a predetermined position for the signal recording and/or reproduction, slidable means slidable for moving the holder means, rotating means for rotating the medium, pressing means for pressing a portion of the medium to mount the medium on the rotating means, and control means for controlling the pressing means in response to the slidable means.

On the other hand, according to a second one of the aspects of the present invention, a recording and/or reproducing apparatus using a disc-shaped flexible record bearing medium, comprises holder means for receiving the medium and movable for placing the received medium at a predetermined position for signal recording and/or reproduction, slidable means slidable for moving the holder means, head means for recording signals on and/or reproducing recorded signals from the medium, rotating means for rotating the medium relative to the head means, stabilizing means for stabilizing the medium relative to the head means, and control means for controlling the stabilizing means in response to the slidable means.

The first and second aspects of the invention described above of course can be combined in an embodiment of the invention. In the event that the above-stated slidable means consists of a pair of slidable members, for example, it is advantageous to associate the control means for controlling the pressing means which is related to the first aspect of the invention with one of the slidable members and also to associate the control means for the stabilizing means which is related to the second aspect with the other slidable member. Further, in that event, these control means may be respectively arranged in the form of cams at the slidable members together with cams provided for moving the above-stated holder means.

These and further objects and features of the invention will become apparent from the following detailed description of a preferred embodiment thereof taken in conjunction with the accompanying drawings.

BRIEF DESCRIPTION OF THE DRAWINGS

A preferred embodiment of the invention is arranged as shown in the accompanying drawings, in which:

FIG. 3 is a side view taken from one side indicated by a line III—III of FIG. 2.

FIG. 4 is a side view taken from another side indicated by a line IV—IV of FIG. 2.

FIG. 5 is a sectional view taken on a line V—V of FIG. 2.

DETAILED DESCRIPTION OF THE PREFERRED EMBODIMENT

Figure 1:
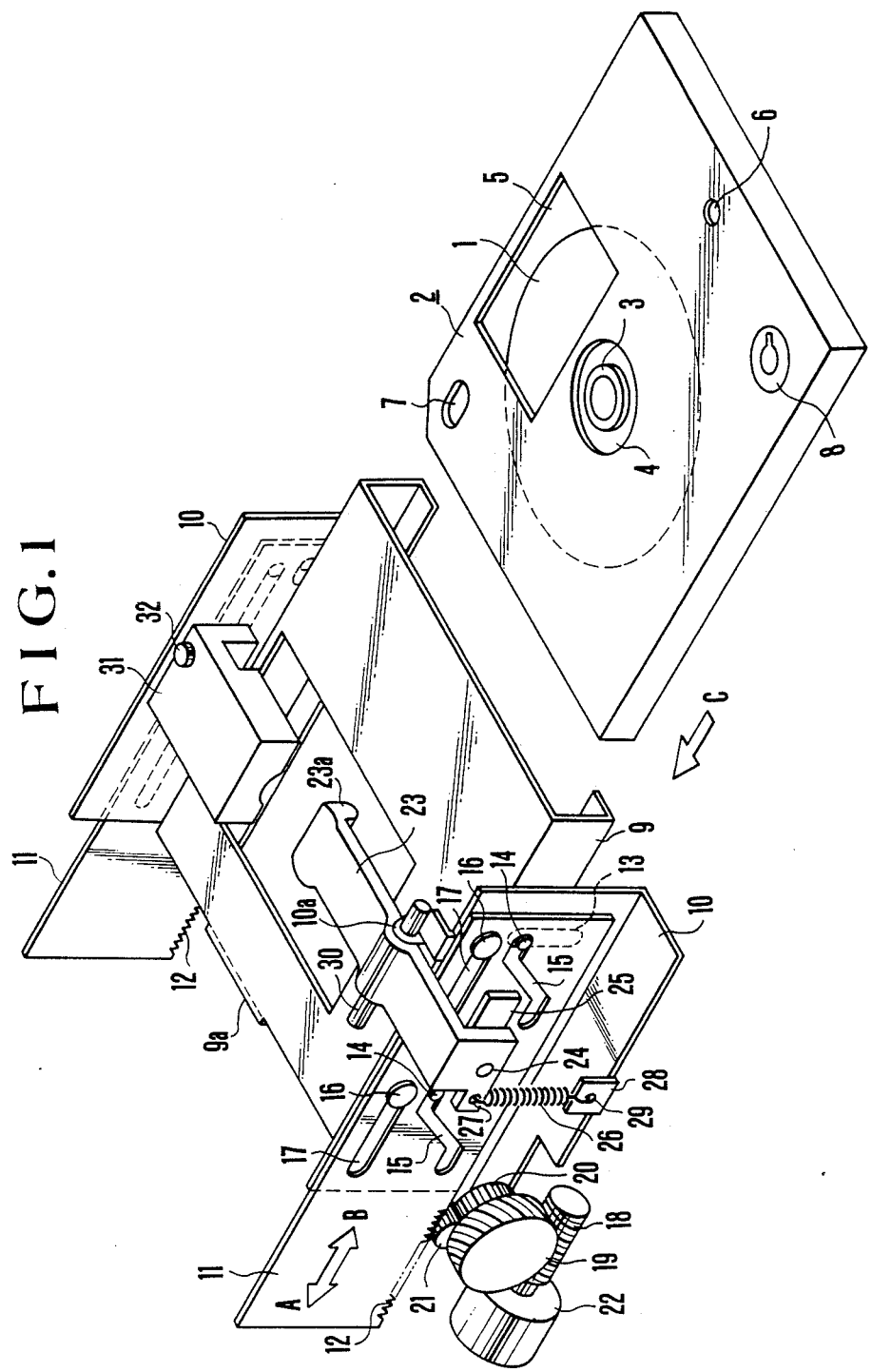
FIG. 1 is an oblique view showing the embodiment as in a state before a cassette is loaded thereon.

In FIGS. 1–5, a reference numeral 1 denotes a flexible magnetic disc which is employed as an example of a flexible disc-shaped record bearing medium. In this specific embodiment of the invention, the magnetic disc 1 is arranged to have recording tracks concentrically formed thereon. A cassette 2 is arranged to have the magnetic disc 1 placed therein. A center core 3 is provided in the middle part of the magnetic disc 1 and is arranged to be fitted on a magnetic disc rotating driving part which is, for example, a spindle 41 mounted on the rotating shaft 40a of a disc rotating motor 40 as shown in FIG. 5. The cassette 2 is provided with an opening 4 in the middle part thereof corresponding to the center core 3 of the disc 1. An opening similar to the opening 4 is formed also on the reverse side of the cassette 2. Further formed in the cassette 2 is a window 5 which is arranged to permit a stabilizing member 31 to be inserted therein as will be described later herein. A window similar to the window 5 is formed also on the reverse side of the cassette 2 to admit to the inside of the cassette 2 a recording and/or reproducing head such as a magnetic head 8 as shown in FIG. 5. Positioning holes 6 and 7 are provided also in the cassette 2 for the purpose of positioning the cassette 2 in a predetermined loading place within the recording and/or reproducing apparatus. Positioning pins 44 and 45 (see FIG. 2) are provided on a chassis 43 (FIGS. 3, 4 and 5) for positioning the cassette 2 by engaging with the holes 6 and 7 at the time of loading the apparatus with the cassette 2. A counter 8 is arranged on the cassette 2 to indicate the address of each of the recording tracks.

A holder 9 is arranged to carry the cassette 2 and to have the cassette 2 inserted therein in the direction of arrow C and taken out in a direction reverse to the direction of the arrow C. Two pins 14 are erected on each of two sides of the cassette holder 9. A frame 10 is secured to the chassis 43 by means of screws (not shown) and is provided with a pair of slots 13 extending in a vertical direction as viewed on FIG. 1. A pair of pins 16 are erected on the frame 10. A slide member 11 is arranged to be slidable in the directions of arrows A and B along the frame 10. The slide member 11 is provided with a rack 12; a pair of cam slots 15; and a pair of slots 17 which extend in the directions of arrows A and B. The pair of pins 14 engage with the cam slots 15 of the slide member 11 through the slots 13 of the frame 10. The pins 14 move upward or downward along the slots 13 according as the slide member 11 slides in the direction of arrow A or B as will be further described later. The pair of pins 16 of the frame 10 engage with the slots 17 of the slide member 11 to carry the slide member 11 in such a way as to allow the slide member 11 to slide along the frame 10 and to restrict the sliding extent thereof. The frame 10 and the slide member 11 are arranged in pairs with another frame 10 and another slide member 11 on the left and right sides of the holder 9 together with other related members respectively. A worm gear 18 is arranged to be driven by a driving motor 22. A worm wheel 19 engages with the worm gear 18. A gear 20 which is coaxial with the worm wheel 19 engages with another gear 21. The gear 21 engages with the rack 12 of the slide member 11. The shaft 42 of the gear 21 extends to the other slide member 11 and another gear 21 engages with the rack 12 of the other slide member 11 on the opposite side. With the gears 21 and their shaft 42 arranged in this manner, the pair of left and right slide members 11 are arranged to be slidable in synchronism with each other.

The cassette loading mechanism which is arranged as described above operates as follows: In loading the cassette 2, the cassette 2 is inserted in the holder 9 either manually or by some suitable means in the direction of arrow C until its rear end is stopped by a restricting part 9a of the holder 9. Then, a cassette detecting switch (not shown) detects the insertion of the cassette 2 and causes the motor 22 to begin to operate. The motor 22 causes the slide members 11 to slide in the direction of arrow B. Then, each of the pins 14 of the holder 9 moves along the cam slots 15 of the slide members 11 while its movement in the directions of arrows A and B is prevented by the slots 13 of the frames 10. Therefore, each of the pins 14 moves downward along the slots 13. Thus, the cassette 2 which is carried by the holder 9 comes down to a predetermined loading position.

In this instance, it is possible, for example, to detect the downward movement of the cassette 2 by some suitable detecting means to actuate thereby a pressing member 23 which will be described later to push thereby the center core 3 of the magnetic disc 1 to forcedly mount it on the spindle 41 of the disc rotating motor 40 which is arranged to rotate the magnetic disc; after that, to retire the pressing member 23 from the center core 3 by a return spring or the like; and then to have a stabilizing member 31 which will be described later moved to a predetermined operative position.

In unloading the cassette 2, the above-stated stabilizing member 31 is retracted from the operative position in response to the operation of an ejecting operation member (not shown). Following this, the motor 22 is caused to rotate in a direction reverse to the direction in which it rotates for loading. With the motor 22 thus caused to rotate in the unloading direction, the slide members 11 slide in the direction of arrow A. Then, the holder 9 and the cassette 2 move upward to their initial positions. The cassette 2 is taken out from the holder 9 under this condition.

In order to have the center core 3 of the magnetic disc 1 pushed onto the spindle 41 by operating the pressing member 23 and/or to shift the stabilizing member to its operative position, the arrangement in general necessitates use of an additional drive source for that purpose. However, the arrangement complicates the structural arrangement of the apparatus. It is another shortcoming that if, for example, the pressing member 23 and/or the stabilizing member 31 is to be operated by means of a plunger, a plunger operating switch cannot be turned on before the cassette 2 is moved down to a given position by the movement of the slide member 11 in the direction of arrow B and before the driving motor 22 comes to a stop. Therefore, there arises a loss in the loading time as a whole and the arrangement makes it hardly possible to shorten the loading time.

Whereas, in the case of the embodiment of this invention, the provision of means for moving the pressing member and the stabilizing member in association with the movement of the slide member solves the above-stated problems. Referring to the parts of FIG. 1 and FIGS. 2-5 which have not been described in the foregoing, further details of the specific embodiment of this invention are as follows: The pressing member 23 is provided with a center core pressing part 23a and a pin 24. The fore end of the pin 24 is formed in a half-sphere shape. The urging force of a spring 26 caused the half-sphere shaped end of the pin 24 to abut on a cam 25 which is secured to one of the slide members 11 and is arranged to serve as means for controlling the pressing member 23. The spring 26 has one end thereof attached to a hole 27 of the pressing member 23 and the other end to a hole 29 which is provided in a bent part 28 of the frame 10. A shaft 30 pivotally carries the pressing member 23 and is carried by a part 10a of one of the frames 10. The pressing member 23 is thus arranged to be turnable on the shaft 30.

The stabilizing member 31 is arranged to have the travel (or rotation) of the magnetic disc 1 stabilized for the head 8. A guide shaft 32 (see FIG. 5) is arranged to allow the stabilizing member 31 to be moved upward or downward. The stabilizing member 31 is provided with a pin 33. As shown in FIG. 3, the pin 33 engages via the slot 34 of the other frame 10 with a cam slot 35 which is formed in the other slide member 11 and is arranged to serve as means for controlling the stabilizing member 31. When the slide members 11 slide in the directions of arrows A and B, the stabilizing member 31 moves upward and downward through the pin 33.

Again referring to FIG. 5, a head carriage 39 is arranged to carry the head 8 and to be movable in the directions of arrows F and G. A motor 40 is arranged to rotate the magnetic disc with a spindle 41 attached to the rotating shaft 40a of the motor. The center core 3 of the disc 1 is arranged to be mounted on the spindle 41. The spindle 41 is provided with a flange part 41a for receiving the lower surface of the center core 3 of the disc 1.

Figure 2:
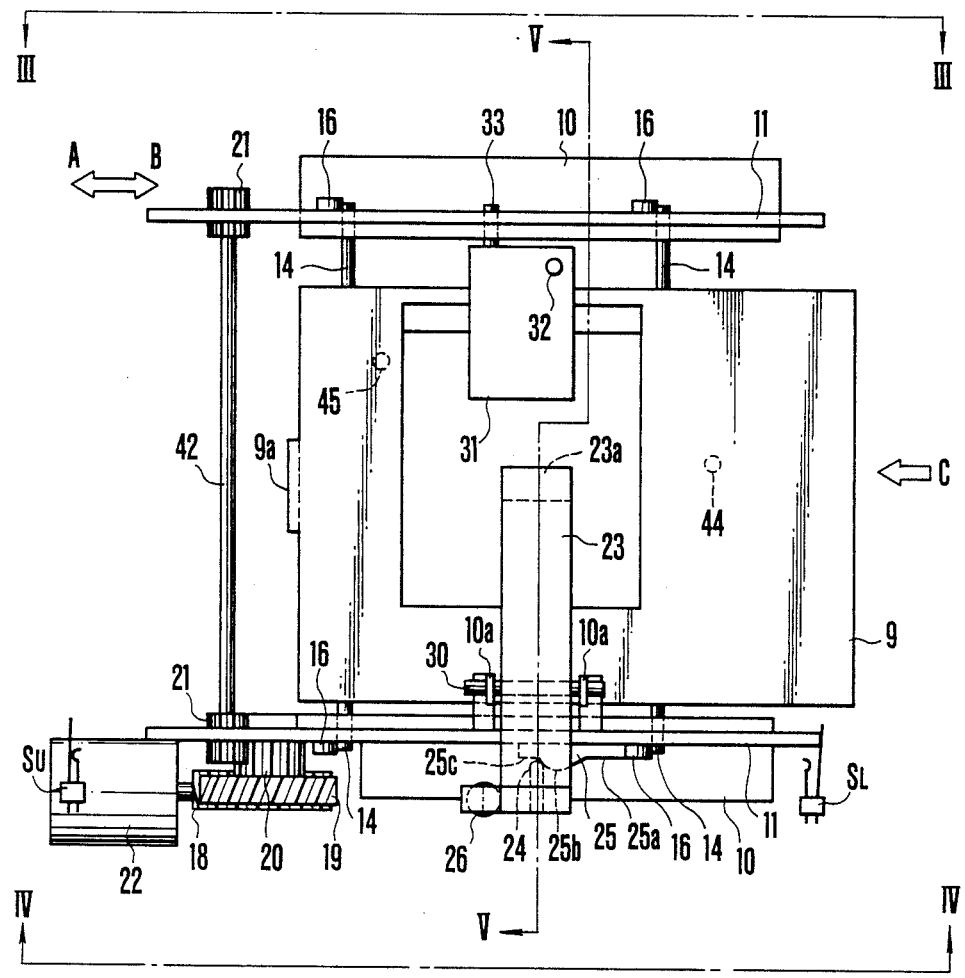
FIG. 2 is a plan view showing the embodiment as in a state of having a cassette loading operation completed.

In the apparatus which is arranged as described above, the pressing member 23 operates as follows: Normally, a low lift portion 25a of the cam 25 which is shown in FIG. 2 is opposed to the pin 24 of the pressing member 23. Therefore, the pressing member 23 is normally in a position as indicated by a two-dot-chain line in FIG. 5. However, when the slide members 11 move in the direction of arrow B at the time of loading the cassette 2, the pin 24 comes to confront a high lift portion 25b of the cam 25 either immediately before or after the cassette 2 reaches the abovestated predetermined loading position. Then, this causes the pressing member 23 to turn on the shaft 30 in the direction of arrow D against the force of the spring 26. As a result of this, the center core 3 is forcedly pushed onto the spindle 41 by the pressing part 23a. By this, the center core 3 is accurately positioned on a predetermined mounting plane defined by the upper surface of the flange part 41a of the spindle 41. When the slide members 11 further move, a low lift portion 25c of the cam 25 (FIG. 2) comes to confront the pin 24 to allow the pressing member 23 to be turned to a small degree in the direction of arrow E as shown in FIG. 5 by the urging force of the spring 26. The pressing part 23a of the pressing member 23 thus moves away from the center core 3. The pressing member 23 and the operating mechanism thereof, therefore, never impose any extra load on the disc rotating motor 40 during recording or reproduction. In unloading the cassette, the pressing member 23 is moved back to its original position by an operation performed in a manner reverse to the above-stated operation.

The stabilizing member 31 operates as follows: When the slide members 11 moves in the direction of arrow B, the pin 33 of the stabilizing member 31 moves along the cam slot 35 of the slide member 11 (FIG. 3). However, the pin 33 is prevented from moving in the directions of arrows A and B by the slot 34 of the frame 10. Therefore, the pin 33 is allowed to move only downward along the slot 34. FIG. 3 shows the pin 33 as in a state of having been moved dowanward. The stabilizing member 31 is thus moved downward from the position shown by the two-dot-chain line to a predetermined position as shown in FIG. 5. With the stabilizing member 31 in this position, a layer of air is formed in a desired thickness between the stabilizing member 31 and the magnetic disc 1 when the latter is rotated. This arrangement enables the magnetic disc 1 to stably rotate retaining a satisfactory contact condition between the magnetic head 8 and the magnetic disc 1. In unloading the cassette 2, the stabilizing member 31 is moved back to its original position by an operation performed in a manner reverse to the above-stated operation.

Figure 6:
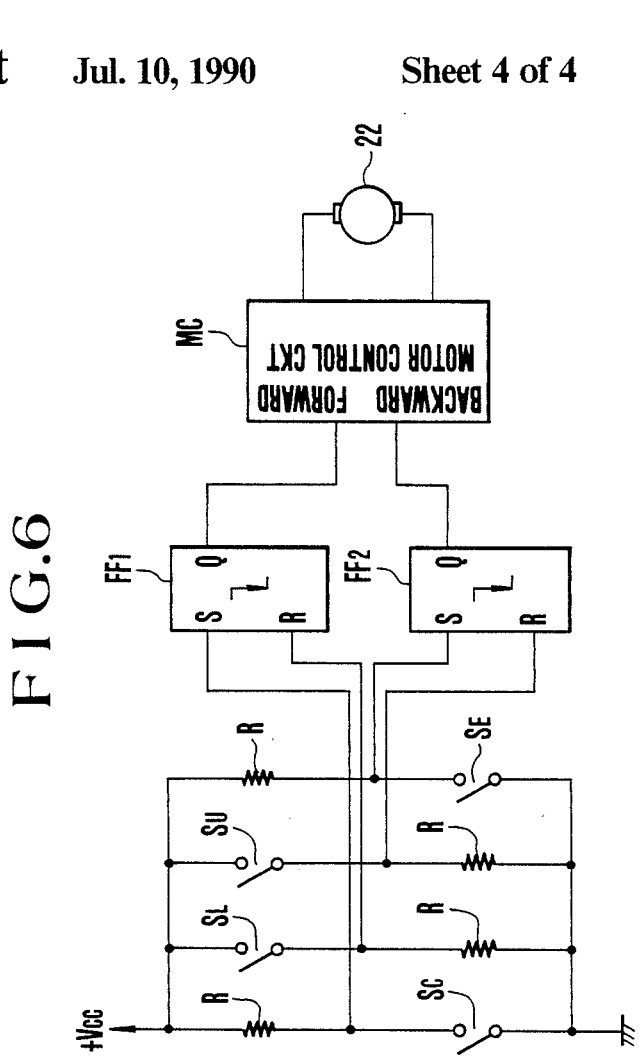
FIG. 6 is a circuit diagram showing an example of a control circuit provided for a loading motor as in a state of having a cassette loading operation completed.

FIG. 6 shows an example of control circuit arrangement for the loading motor 22 mentioned in the foregoing. The circuit includes a normally open type switch SC for cassette detection. The switch SC is arranged to be closed when the cassette 2 is inserted into the holder 9 until further insertion is restricted by the restricting part 9a of the holder 9. A normally closed type switch SL is arranged to detect completion of cassette loading. For example, the switch SL is arranged to be opened when the slide members 11 are moved in the direction of arrow B to their end positions as shown in FIG. 2. Another normally open type switch SE is arranged to be closed by the operation of an ejecting operation member. Another normally closed type switch SU is provided for detecting completion of a cassette unloading operation. The switch SU is arranged to be opened, for example, when the slide members 11 are moved in the direction of arrow A to their end positions in that direction. These switches SC, SL, SE and SU are respectively connected to resistors R. A first RS flip-flop FF1 of the fall edge synchronizing type is arranged to be set when the switch SC turns on and to be reset when the switch SL turns off. A second RS flip-flop FF2 of the fall edge synchronizing type is arranged to be set when the switch SE turns on and to be reset when the switch SU turns off. A motor control circuit MC is arranged to have the slide members 11 moved in the direction of arrow B by causing the motor 22 to rotate forward, for example, when the Q output of the first flip-flop FF1 is at a high level and to have the slide members 11 moved in the direction of arrow A by causing the motor 22 to rotate backward when the Q output of the second flip-flop FF2 is at a high level.

In loading the cassette 2, the cassette detecting switch SC turns on when the cassette 2 inserted into the holder 9 comes to be restricted by the restricting part 9a. With the switch SC turnes on, the first flip-flop FF1 is set. The level of the Q output of the flip-flop FF1 becomes high. In response to the high level Q output of the flip-flop FF1 the motor control circuit MC causes the motor 22 to rotate forward. This causes the slide members 11 to slide in the direction of arrow B. After the cassette 2 is set in its loading position; after the pressing member 23 is operated; and after the stabilizing member 31 is set in its operative position, the slide members 11 reach the end positions in the direction of arrow B. Then, when the loading completion detecting switch SL is turned off, the first flip-flop FF1 is reset. The level of the Q output of the first flip-flop FF1 becomes low. The motor control circuit MC then stops the motor 22.

In unloading the cassette 2, the second flip-flop FF2 is set with the switch SE closed by the operation of the ejecting operation member. The level of the Q output of the second flip-flop FF2 becomes high. In response to the high level of Q output of the flip-flop FF2, the motor control circuit MC causes the motor 22 to rotate backward. Accordingly, the slide members 11 is moved in the direction of arrow A. The holder 9, the pressing member 23 and the stabilizing member 31 are brought back to their original positions. After that, the slide members 11 reach their end positions in the direction of arrow A to turn off the unloading completion detecting switch SU. With the switch SU turned off, the second flip-flop FF2 is reset. The level of the Q output of the flip-flop FF2 becomes low. The motor control circuit MC then stops the rotation of the motor 22.

In accordance with the arrangement of the apparatus described in the foregoing, the pressing member 23 and the stabilizing member 31 can be shifted to their operating positions by the simple operation of just moving the slide members 11. The timing for operating the pressing member 23 and the stabilizing member 31 can be set as desired by varying the positions and shapes of the cam 25 and the cam slot 35, so that the length of time required for loading the cassette can be shortened as a whole. Further, the pressing member 23 and the stabilizing member 31 may be brought back to their original positions not in association with the movement of the slide members 11 but by some other suitable means. It is also preferable to have any excessive degree of the urging action of the high lift portion 25b of the cam 25 absorbed by forming pressing member 23 or at least a part of it with some elastic material. In the specific embodiment described, the carrying shaft 30 of the pressing member 23 is provided on a part 10a of the frame 10. However, the shaft 30 may be disposed at a part of the holder 9 instead of the frame 10. In that instance, the cam 25 on the slide member 11 may be arranged along the composite vector of the movement vector of the slide member 11 and that of the holder 9, i.e. along an oblique segment directed from an upper left part to a lower right part of FIG. 4. The same can be said with the stabilizing member 31. The guide shaft 32 may be disposed on the holder 9. In that case, the shape of the cam slot 35 of the slide member 11 must be somewhat changed.

In accordance with this invention, pressing means for loading a record bearing medium is operated and/or a record bearing medium stabilizing means is shifted to its operating position in response to the movement of the sliding means required for a record bearing medium loading operation. The invention, therefore, obviates the necessity of use of an additional drive source for moving the pressing means and the stabilizing means. It is another advantage of the invention that the length of time required for loading can be shortened as a whole by virtue of improved timing for operating these means.

What is claimed is:

1. An apparatus using a disc-shaped medium, comprising:
   (A) holder means for receiving the medium and movable for placing the received medium at a predetermined position for signal recording and/or reproduction;
   (B) slidable means engaged with said holder means and being slidable for moving the holding means;
   (C) rotating means for rotating the medium to be mounted on said rotating means;
   (D) pressing means for pressing a portion of the medium to mount the medium on said rotating means; and
   (E) control means for causing said pressing means to press said portion of said medium and release said pressing in response to sliding of said slidable means; wherein said slidable means moves said holder means between a first position for receiving the medium and a second position for placing the medium at said predetermined position according to the sliding thereof; and said control means controls to cause said pressing means to press said portion of the medium and thereafter release said pressing according to the sliding operation of said slidable means to move said holder means from said first position to said second position without said holder means going beyond said second position.

2. The apparatus according to claim 1, wherein said control means includes a cam provided on a portion of said slidable means.

3. The apparatus according to claim 1, wherein said slidable means has cam means for moving said holder means between said first and said second position.

4. The apparatus according to claim 1, wherein said pressing means is provided on a portion of said slider means.

5. A recording and/or reproducing apparatus using a disc-shaped flexible record bearing medium, comprising:
   (A) holder means for receiving the medium and movable for placing the received medium at a predetermined position for signal recording and/or reproduction;
   (B) slidable means connected with said holder means and being slidable for moving the holder means;
   (C) head means for recording signals on and/or reproducing recorded signals from the medium;
   (D) rotating means for rotating the medium relative to said head means;
   (E) stabilizing means for stabilizing the medium relative to said head means, said means having an effective position and an ineffective position; and
   (F) control means for setting said stabilizing means to its effective position in response to sliding of said slidable means; wherein said slidable means moves said holder means between a first position for receiving the medium and a second position for placing the medium at said predetermined position during the sliding thereof; and said control means moves said stabilizing means from its ineffective to its effective position in response to the sliding of said slidable means for moving said holder means from said first to said second position.

6. The apparatus according to claim 5, wherein said control means includes a cam provided on a portion of said slidable means.

7. The apparatus according to claim 5, wherein said slidable means has cam means for moving said holder means between said first and said second position.

8. The apparatus according to claim 5, wherein said stabilizing means is provided on a portion of said slidable means.

9. A recording and/or reproducing apparatus using a disc-shaped flexible record bearing medium, comprising:
   (A) holder means for receiving the medium and movable for placing the received medium at a predetermined position for signal recording and/or reproduction;
   (B) slidable means connected with said holder means and slidable for moving the holder means;
   (C) head means for recording signals on and/or reproducing recorded signals from the medium;
   (D) rotating means for rotating the medium to be mounted on said rotating means relative to said head means;
   (E) pressing means for pressing a portion of the medium to mount the medium on said rotating means;
   (F) stabilizing means for stabilizing the medium relative to said head means, said means having an effective position and an ineffective position;
   (G) first control means for causing said pressing means to press said portion of said medium in response to sliding of said slidable means; and
   (H) second control means for setting said stabilizing means to its effective position in response to sliding of said slidable means; wherein said slidable means moves said holder means between a first position for receiving the medium and a second position for placing the medium at said predetermined position during the sliding thereof; said first control means causes said pressing means to press the portion of the medium and thereafter release said pressing in response to the sliding of said slidable means for moving said holder means from said first to said second position; and said second control means moves said stabilizing means from its ineffective to its effective position in response to the sliding of said slidable means for moving said holder means from said first to said second position.

10. The apparatus according to claim 9, wherein each of said first and second control means includes a cam provided on a portion of said slidable means.

11. The apparatus according to claim 9, wherein said slidable means has cam means for moving said holder means between said first and said second position.

12. The apparatus according to claim 9, wherein said pressing means is provided on a portion of said slidable means.

13. The apparatus according to claim 12, wherein said stabilizing means is provided on a portion of said slidable means.

14. The apparatus according to claim 9, wherein said stabilizing means is provided on a portion of said slidable means.

15. A magnetic recording and/or reproducing apparatus using a flexible magnetic disc which has a center core and is housed in a cassette having an opening, said apparatus comprising:
   (A) a cassette holder movable in a first direction for placing the received cassette at a predetermined position for signal recording and/or reproduction;
   (B) a slidable member engaged with said holder and slidable in a second direction traversing said first direction for moving the holder;
   (C) a magnet head for recording signals on and/or reproducing recorded signals from the disc, said head being arranged to face with a recording surface of the disc through the opening of the cassette in a state where the cassette is placed at said predetermined position by said holder;
   (D) a rotating spindle for rotating the disc relative to said head, said spindle being engageable with the center core of the disc;
   (E) a pressing member for pressing the center core of the disc relative to said spindle to engage the center core with the spindle; and
   (F) a control cam provided on said slidable member for causing said pressing member to press said center core and to release said pressing in response to the sliding of the slidable member in said second direction; wherein said slidable member moves said holder between a first position for receiving the medium and a second position for placing the medium at said predetermined position according to the sliding thereof; and said control cam controls so as to cause said pressing means to press said portion of the medium and thereafter release said pressing according to the sliding operation of said slidable member to move said holder from said first position to said second position, without moving said holder beyond said second position.

16. The apparatus according to claim 15, wherein said control cam is formed so that the control cam causes the pressing member to press the center core of the disc and thereafter release said pressing in response to the sliding of said slidable member in said second direction.

17. The apparatus according to claim 15, wherein said slidable member has plural cam grooves for moving said holder.

18. A magnetic recording and/or reproducing apparatus using a flexible magnetic disc which is housed in a cassette having a pair of oppositely provided openings, said apparatus comprising:
   (A) a cassette holder movable in a first direction for placing the received cassette at a predetermined position for the signal recording and/or reproduction;
   (B) a slidable member operatively connected with said holder and slidable in a second direction traversing said first direction for moving the holder;
   (C) a magnetic head for recording signals on and/or reproducing recorded signals from the disc, said head being arranged to face with a recording surface of the disc through a first one of the openings of the cassette where the cassette is placed at said predetermined position by said holder;
   (D) a rotating spindle for rotating the disc relative to said head;
   (E) a stabilizing member for stabilizing the disc relative to said head, said stabilizing member being movable to face with a surface of the disc through a second one of the openings of the cassette; and
   (F) a control cam provided on said slidable member for causing said stabilizing member to face with the disc in response to the sliding of the slidable member in said second direction; wherein said slidable means moves said holder means between a first position for receiving the medium and a second position for placing the medium at said predetermined position during the sliding thereof; and said control means moves said stabilizing means from its ineffective to its effective position in response to sliding of said slidable means for moving said holder means from said first to said second position.

19. The apparatus according to claim 18, wherein said slidable member has plural cam grooves for moving said holder.

20. A recording and/or reproducing apparatus using a disc-shaped medium comprising:
   (a) holder means for receiving and holding said medium;
   (b) slide means for moving said holder means between a position for receiving said medium in said holder means and a predetermined position for signal recording and/or reproducing;
   (c) a spindle for rotating said medium; and
   (d) press means responsive to said slide means, said press means being arranged to press said received medium onto said spindle, and then release said pressing according to the sliding operation of said slide means to move said received medium from the receiving position to said predetermined position without turning a sliding direction of said slide means.

21. The apparatus according to claim 20, wherein said press means includes:
   (a) a press member for pressing said medium to said spindle; and
   (b) a cam engaged to said slide means, said cam pressing said received medium to the spindle in response to the slide of said slide means, and thereafter departing therefrom.

22. The apparatus according to claim 20, further comprising:
   means for rotating a medium pressed on said spindle by said press means.

23. The apparatus according to claim 20, wherein said slide means includes:
   slidable means engaged with said holder means, said holder means being movable between said received position and said predetermined position for signal recording and/or reproducing without being moved beyond said predetermined position, while holding said received medium, by effecting the sliding operation of said slide means.

24. The apparatus according to claim 21, wherein said cam member is provided on said slide means.

25. The apparatus according to claim 21, wherein said press member is pivoted on a guide rod.

26. A recording and/or reproducing apparatus using a flexible disc-shaped medium having a center core comprising:
   (a) holder means for receiving said medium;
   (b) slide means for moving said holder means between a position for receiving said medium in said holder means and a predetermined position for signal recording and/or reproducing;
   (c) a spindle for rotating said medium at said predetermined position; and
   (d) press means responsive to said slide means, for pressing said core of said medium to said spindle, said press means being arranged to press said received medium onto said spindle, and then release said pressing according to the sliding operation of said slide means to move said received medium from said receiving position to said predetermined position without turning a sliding direction of said slide means.

27. The apparatus according to claim 26, wherein said press means includes:
   (a) a press member for pressing said medium to said spindle; and
   (b) a cam engaged to said slide means, said cam pressing said received medium to the spindle in response to the slide of said slide means, and thereafter departing therefrom.

28. The apparatus according to claim 26, further comprising:
   means for rotating a medium pressed on said spindle by said press means.

29. The apparatus according to claim 26, wherein said slide means includes:
   slidable means engaged with said holder means, said holder means being movable between said receiving position and said predetermined position for signal recording and/or reproducing while holding said received medium.

30. A recording and/or reproducing apparatus using a cassette containing a disc-shaped medium, comprising:
   (a) a holder member movable between a first position for receiving a cassette and a second position for signal recording and/or reproducing;
   (b) a slide member slidable in a predetermined direction with a movement of said holder member from said first position to said second position;
   (c) a spindle provided so as to rotate said medium in the cassette; and
   (d) press means responsive to sliding operation of said slide member in said predetermined direction without turning said predetermined direction to effect continuous pressing of said medium in said cassette and then releasing said pressing.

31. An apparatus according to claim 30, wherein said press means includes a press member for pressing said medium to said spindle, and a cam engaged to said slide means, said cam being provided so as to press said receive medium to said spindle in response to the sliding of said slide member and thereafter depart therefrom.

32. An apparatus according to claim 30, and further comprising means for rotating a medium pressed on said spindle said press means.

33. An apparatus according to claim 30, wherein said slide member and said holder member are connected with each other and said holder member is movable between said first and said second position by sliding operation of said slide member.

34. An apparatus according to claim 31, wherein said cam member is provided on said slide member.

35. An apparatus according to claim 31, wherein said press member is pivoted on a guide rod.

* * * * *